US006813690B1

(12) United States Patent
Lango et al.

(10) Patent No.: US 6,813,690 B1
(45) Date of Patent: Nov. 2, 2004

(54) CACHING MEDIA DATA USING CONTENT-SENSITIVE IDENTIFIERS

(75) Inventors: Jason Lango, Mountain View, CA (US); Jeffrey Dale Merrick, Mountain View, CA (US); Konstantinos Roussos, Sunnyvale, CA (US); Robert Tsai, Atlanta, GA (US); J. Christopher Wagner, Langley, WA (US)

(73) Assignee: Network Appliance, Inc., Sunnyvale, CA (US)

( * ) Notice: Subject to any disclaimer, the term of this patent is extended or adjusted under 35 U.S.C. 154(b) by 350 days.

(21) Appl. No.: 09/981,668

(22) Filed: Oct. 16, 2001

Related U.S. Application Data

(60) Provisional application No. 60/297,997, filed on Jun. 12, 2001, provisional application No. 60/297,943, filed on Jun. 12, 2001, and provisional application No. 60/297,945, filed on Jun. 12, 2001.

(51) Int. Cl.[7] .............................................. G06F 12/02
(52) U.S. Cl. ........................ 711/118; 711/113; 711/137; 707/103 R; 707/103 Y
(58) Field of Search ................................ 711/118, 113, 711/137; 707/103 R, 103 Y, 10

(56) References Cited

U.S. PATENT DOCUMENTS 5,615,362 A * 3/1997 Jensen et al. ........... 707/103 R
5,799,185 A * 8/1998 Watanabe .................... 707/206
6,085,193 A * 7/2000 Malkin et al. ................ 707/10
6,594,751 B1 * 7/2003 Leivent ....................... 711/209

OTHER PUBLICATIONS

NetCache™ 5.1 Web Cache First–Time Configuration Guide, Apr. 2001.
NetCache™ 5.1 Routine Administration Guide, Apr. 2001.
NetCache™ 5.1 Configuration Guide, Apr. 2001.
NetCache™ 5.1 Deployment Planning Guide, Apr. 2001.
NetCache™ 5.1 Features and Configuration Planning Guide, Apr. 2001.
NetCache™ 5.1 Streaming Media Cache First–time Configuration Guide, Apr. 2001.
NetCache™ 5.1 Accelerator First–Time Configuration Guide, Apr. 2001.

* cited by examiner

*Primary Examiner*—T Nguyen
(74) *Attorney, Agent, or Firm*—Townsend and Townsend and Crew, LLP

(57) ABSTRACT

Techniques for caching media data, including streaming media data, using content-sensitive identifiers. The content-sensitive identifiers enable a caching proxy or a caching server to unambiguously determine the version or contents of media data cached by the caching proxy for a particular data pointer or data reference (e.g., a URL) such that an appropriate version of the media data can be served to a requesting client system in an efficient and economical manner.

55 Claims, 5 Drawing Sheets

300

```
┌─────────────────────────────────────────────┐
│ CACHING SERVER RECEIVES INFORMATION (INCLUDING │
│ MEDIA DATA DESCRIPTION INFORMATION AND MEDIA│──302
│ DATA (PAYLOAD)) TO BE CACHED                │
└─────────────────────────────────────────────┘
                    │
                    ▼
┌─────────────────────────────────────────────┐
│ INFORMATION RECEIVED IN STEP 302 IS PARTITIONED │
│ INTO STORAGE UNITS (OBJECTS) WHICH CAN BE CACHED │──304
└─────────────────────────────────────────────┘
                    │
                    ▼
┌─────────────────────────────────────────────┐
│ CACHING SERVER CONFIGURES AND ASSOCIATES AN │
│ OBJECT NAME STRING WITH EACH OBJECT GENERATED │──306
│ IN STEP 304                                 │
└─────────────────────────────────────────────┘
                    │
                    ▼
┌─────────────────────────────────────────────┐
│ FOR EACH OBJECT CREATED IN STEP 304, THE OBJECT │
│ NAME STRING GENERATED FOR THE OBJECT IN STEP 306│
│ IS HASHED TO GENERATE AN OBJECT IDENTIFIER FOR │──308
│ THE OBJECT                                  │
└─────────────────────────────────────────────┘
                    │
                    ▼
┌─────────────────────────────────────────────┐
│ OBJECTS GENERATED IN STEP 304 AND STORING   │
│ PORTIONS OF THE MEDIA DATA RECEIVED IN STEP 302 │
│ ARE CACHED. MAPPING INFORMATION MAPPING OBJECT │
│ IDENTIFIERS (GENERATED IN STEP 308) TO OBJECT │──310
│ HANDLES IS STORED IN A CACHE ENTRY HASH TABLE │
└─────────────────────────────────────────────┘
```

<Reserved String>:<URL>/<Encoding>/<Validator>/<Object#>
402           404        406         408          410

CACHING MEDIA DATA USING CONTENT-SENSITIVE IDENTIFIERS

CROSS-REFERENCES TO RELATED APPLICATIONS

The present application claims priority from the following provisional applications, the entire contents of which are herein incorporated by reference for all purposes:

(1) U.S. Provisional Application No. 60/297,997, entitled "CONTENT-SENSITIVE NAMING OF CACHED OBJECTS" filed Jun. 12, 2001, the entire contents of which are herein incorporated by reference for all purposes;

(2) U.S. Provisional Patent Application No. 60/297,943, entitled "STREAMING MEDIA PAYLOAD STORAGE METHOD AND APPARATUS" filed Jun. 12, 2001; and (3) U.S. Provisional Patent Application No. 60/297,945, entitled "PRE-COMPUTING STREAMING MEDIA PAYLOAD METHOD AND APPARATUS" filed Jun. 12, 2001.

The present application incorporates by reference for all purposes the entire contents of U.S. Non-Provisional Patent Application No. 09/981,644, entitled "METHODS AND APPARATUS FOR PACING DELIVERY OF STREAMING MEDIA DATA" filed concurrently with the present application.

BACKGROUND OF THE INVENTION

The present invention relates to data caching, and more particularly to techniques for caching media data, including streaming media data, using content-sensitive identifiers.

The advent of communication networks such as the Internet has enabled users to access data stored by one or more servers coupled to the communication networks. The data may be stored in files on the servers and may be accessed by users using client systems coupled to the servers via one or more communication networks. The term "client system" is intended to refer to any computer system or like mechanism which is used by a user to request information or data stored by a server or to request a service provided by a server. The term "server system" is intended to refer to any computer system or like mechanism which stores information and provides the information in response to a user request received from a client computer, and/or provides some service. It should be apparent that a particular computer system may function both as a client and as a server.

The data stored by the servers may include media data, including streaming media data. The term "media data" is intended to include data of various types including audio data, video data, image data, streaming media data, and other types of data and combinations thereof. The term "streaming media data" is generally used to refer to media data intended to be transported at a select (often, subscribed) bit rate, and with a desired timeliness. The streaming media is adapted for playback in a desired order without regard to the order the streaming media data is received by a client system. Streaming media generally conforms to a real-time delivery protocol, such as, e.g., Real Time Streaming Protocol (RTSP), RTP, or the like. Streaming media data may also refer to data that may be contained in files stored by a media server that begin playing while the files are being transmitted over the network to a media player executing on a client system. This is in contrast to conventional data files that must be downloaded entirely to a client system before the user can view/play them using the client system. Streaming media may comprise a combination of video data, audio data, image data, interactive media data, animation data, panoramic data, executable files, presentation data, applet data, data files and other types of data in an integrated form. Streaming media data may also include "live" data streams.

Data pointers and/or data references are typically provided to enable users to access the stored data. For example, in the World Wide Web ("Web") environment, a user may access data stored in a particular file by selecting a Uniform Resource Locator (URL) associated with the particular file. Using the client system, the user may configure a data request by selecting a URL using a program such as a browser or a multimedia player executing on the client system. In response to the data request, data corresponding to the user-selected URL may be communicated to the client system and output to the user. Examples of browsers include the Internet Explorer browser program provided by Microsoft Corporation, the Netscape Navigator browser provided by Netscape Corporation, and others. Examples of media players include RealPlayer™ provided by RealNetworks, Microsoft Windows Media Player provided by Microsoft Corporation, and QuickTime™ Player provided by Apple Corporation, and others. Various other programs may also be used to configure data requests and to output the data received in response to the data requests.

Caching proxies or servers may be used to reduce the time required to provide the requested data to the clients. Typical file caching methods include a cache receiving a file from a file server, and storing the entire file. Later, when a user requests data stored by the file, instead of serving the file from the file server, the file is served from the cache. Because the cache is typically a server that is closer to the client or has a higher bandwidth than the file sever, the file is served to the client quickly from the cache.

However, attempting to apply typical file caching methods to files that store media data, especially streaming media data, raises many problems. For instance, serving a streaming media data file from a cache requires much more processing by the cache than with classical file transfers over the web. Unlike static web servers, conventional servers which store streaming media data (referred to as "streaming media data servers") do not provide information on the expected length of time that the media data associated or represented by a particular data pointer or data reference (for example, a URL) and stored by the streaming media data servers will remain unchanged (i.e., streaming media URLs do not unambiguously identify content associated with the URL). Due to this, at any given time, conventional caching proxies or caching servers that cache the media data streams for a particular URL cannot unambiguously determine if the version of the media data cached by the caching proxy for the particular URL is the same as the media data stored by the media data server for the particular URL. For example, the media data associated with a particular URL may have changed on the media data server after a caching server caches the data. As a result, when servicing a client media data request for the particular URL, the caching server may serve out a version of the media data to a client system which is outdated (also referred to as "stale data") and which does not correspond to the media data associated with the URL and stored by the media data server ("current data").

Thus, there is a need for techniques that enable a caching proxy or a caching server to unambiguously determine the version of media data cached by the caching proxy for a particular data pointer or data reference (e.g., a URL) such that an appropriate version of the media data is served to a requesting client system in an efficient and economical manner.

BRIEF SUMMARY OF THE INVENTION

The present invention provides techniques for caching media data, including streaming media data, using content-sensitive identifiers. The content-sensitive identifiers provided by the present invention enable a caching proxy or a caching server to unambiguously determine the version or content of media data cached by the caching proxy for a particular data pointer or data reference.(e.g., a URL) such that an appropriate version of the media data can be served to a requesting client system in an efficient and economical manner.

According to another embodiment of the present invention, techniques are provided for storing media data in a cache. In this embodiment, a caching server system receives information associated with a data pointer (e.g., a URL), the information comprising media data. The caching server stores the media data in the cache as a plurality of objects wherein each object in the plurality of objects storing a portion of the media data. The caching server generates an object identifier for each object in the plurality of objects based upon the information associated with the data pointer and the portion of the media data stored by each object, wherein the object identifier for an object unambiguously identifies the portion of the media data stored by the object.

According to another embodiment of the present invention, techniques are provided for communicating media data from a cache in response to a data request. In this embodiment, a caching server stores media data in the cache as a plurality of objects, each object in the plurality of objects storing a portion of the media data. The caching server also stores mapping information that maps each object in the plurality of objects to an object identifier generated for the object, wherein the object identifier for an object unambiguously identifies the portion of the media data stored by the object. The caching server receives a data request from a first system requesting media data associated with a data pointer. In response to receiving the data request, the caching server reads media data description information associated with the data pointer from a media data server storing the requested media data for the data pointer, the media data description information comprising information related to properties of the media data requested by the data request. The caching server then generates object identifiers for the data request based upon the requested media data and the media data description information, the object identifiers unambiguously identifying the requested media data. The caching server searches the mapping information to determine if the object identifiers generated for the data request are included in the mapping information. The caching server retrieves, from the cache, a set of objects corresponding to the object identifiers for the data request that are included in the mapping information, and communicates media data stored by the set of objects retrieved from the cache to the first system.

The foregoing, together with other features, embodiments, and advantages of the present invention, will become more apparent when referring to the following specification, claims, and accompanying drawings.

BRIEF DESCRIPTION OF THE DRAWINGS

FIG. 3 is a simplified high-level flowchart of a method of configuring content-sensitive identifiers and using the content-sensitive identifiers to store cached objects according to an embodiment of the present invention;

DETAILED DESCRIPTION OF THE INVENTION

The present invention provides techniques which enable a caching proxy or a caching server to unambiguously determine the version or content of media data cached by the caching proxy for a particular data pointer or data reference (e.g., a URL) such that an appropriate version of the media data can be served to a requesting client system in an efficient and economical manner. According an embodiment of the present invention, content sensitive identifiers are configured and associated with media data cached by the caching server. The caching server may then use the content-sensitive identifiers to unambiguously determine the contents or version of the media data stored by the caching server and serve an appropriate version of the cached media data to a requesting client system. While the present invention has been described using streaming media data, the scope of the present invention as recited in the claims is not limited to streaming media data. It should be apparent that techniques according to the present invention may also be applied to other types of data.

Figure 1:
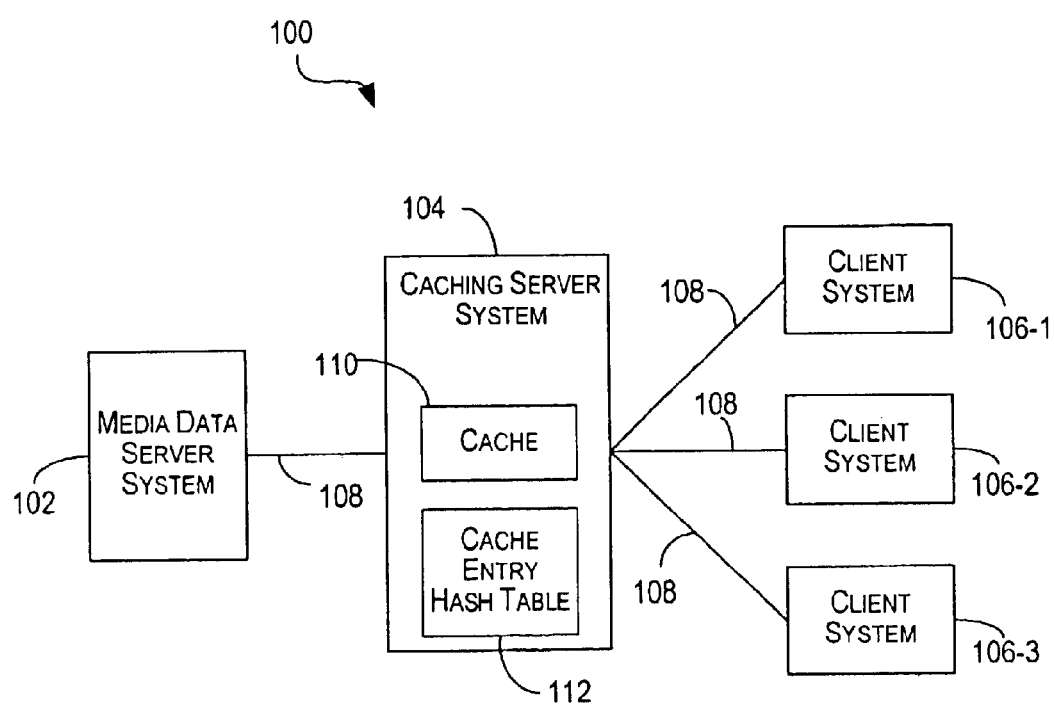
FIG. 1 is a simplified block diagram of a network system that may incorporate an embodiment of the present invention.

FIG. 1 is a simplified block diagram of a network system 100 that may incorporate an embodiment of the present invention. As shown, network system 100 comprises a number of computer systems including a media data server system 102, a caching server system 104, and a plurality of client systems 106 coupled to each other via communication links 108. Network system 100 depicted in FIG. 1 is merely illustrative of an embodiment incorporating the present invention and does not limit the scope of the invention as recited in the claims. One of ordinary skill in the art would recognize other variations, modifications, and alternatives.

Communication links 108 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP protocol, HTTP protocols, extensible markup language (XML), wireless application protocol (WAP), vendor-specific protocols, customized protocols, and others. Communication links 108 may also represent communication paths through interconnected computer networks, intermediary devices, switches, routers, other communication links, and the like. The computer networks may include the Internet, local area networks (LANs), wide area networks (WAN), wireless networks, intranets, private networks, public networks, switched networks, and the like.

In the embodiment depicted in FIG. 1, a user may use a client system 106 to request media data stored by media data server 102. For purposes of describing the invention, it is assumed that the user requests streaming media data stored by media data server 102. As described above, various applications executing on client system 106 may facilitate configuration of the data requests. These applications may include browsers, multimedia players, and the like. For example, a data request may take the form of a user clicking a particular URL on a web page displayed by a browser, or the like. Client system 106 are also configured to receive media data, including streaming media data, in response to the data requests and to output the media data to the user.

A data request from a client system may be communicated to media data server 102 or to caching server 104. According to an embodiment of the present invention, the data request may be intercepted by an intermediary network device such as a router (which may be embodied as a Layer 4 or Layer 7 switch, a WCCP router, or any other switch or router) which may be configured to recognize a data request requesting media data. When the intermediary network device identifies such as request, the data request may be redirected to caching server 104 instead of media data server 102. Client system 106 need not be aware that the data request is routed to caching server 104 instead of media data server 102. This method is sometimes referred to as "transparency" or "transparent caching".

Media data server 102 is configured to store media data, including streaming media data that may be requested by client systems 106. For example, media data server 102 may store media data associated with one or more URLs. The media data may be stored in the form of media files. Media data server 102 may also store information (referred to as "media data meta-data" or "media data description information") describing characteristics or attributes of the stored media data. Media data server 102 is configured to receive data requests, either from caching server system 104 or from client systems 106, to determine media data corresponding to the data requests, and to forward the media data corresponding to the data requests to the requesting systems.

For example, media data server 102 may receive, either from client system 106 or from caching server 104, a data request requesting streaming media data associated with a particular URL. In response to receiving the data request, media data server 102 may determine the streaming media data corresponding to the particular URL and communicate the streaming media data to the requesting computer system. The streaming media data may be communicated to the requesting computer system in various formats including a file format, streaming packets format, and the like. Various streaming media protocols may be used to stream media data to the requesting systems including Microsoft Media Streaming (MMS) protocol used by Windows Media Player™, Real Time Streaming Protocol (RTSP) used by Quicktime™ from Apple Corporation, and RealSystem™ from RealNetworks, and the like.

As shown in FIG. 1, caching server system 104 is deployed in the network path between clients 106 and media data server 102 and is configured to implement caching methods which serve data to client systems 106 in a fast and efficient manner. Caching server 104 is configured to receive media data requests from client systems 106. Upon receiving a data request, caching server 104 determines if the media data requested by the data request is stored or cached by the caching server. If the requested data is cached by caching server 104 (i.e., a cache hit), the cached data is communicated to the requesting client system. If caching server 104 determines that the requested data is not cached by caching server 104 (i.e., a cache miss), caching server 104 requests the data corresponding to the data request from media data server 102 and then delivers the data to the requesting client system, while caching the data. The cached data is then available for subsequent data requests from clients. According to the teachings of the present invention, caching server 104 may store different versions of media data corresponding to a particular URL and serve the cached data to client systems requesting the data.

Caching server 104 may store the cached data in various forms. According to the teachings of the present invention, the media data is cached by caching server system 104 in the form of objects. Each object represents a storage unit which stores a portion of the media data received by caching server system 104 from media data server 102 and cached by caching server 104. According to an embodiment of the present invention, the objects are stored in a cache 110 which may be a storage device coupled to caching server system 104 or a storage subsystem of caching server system 104, e.g., a hard drive, a disk array, and the like.

According to an embodiment of the present invention, each object can be accessed independent of other objects cached by caching server 104. An object may be accessed via an object handle provided by the object. An object handle may be a reference or pointer to an object stored in cache 110. According to an embodiment of the present invention, an object corresponds to a file stored in cache 110. In this embodiment, an object handle corresponds to a file handle that may be used to access the file. Individual files are each independently accessible from cache 110.

According to the teachings of the present invention, caching server system 104 is configured to cache media data using content-sensitive identifiers. These content-sensitive identifiers enable caching server system 104 to unambiguously determine the version or content of the media data cached by the caching server system 104 for a particular data reference or pointer (e.g., for a particular URL). Since the data is cached using objects, according to the teachings of the present invention, caching server 104 generates a content-sensitive identifier for each object and associates the content-sensitive identifier with the object. In the embodiment where an object corresponds to a file, the content-sensitive identifier may correspond to a filename associated with the file. According to the teachings of the present invention, based upon the content-sensitive identifiers, caching server 104 can unambiguously determine if the data cached by the caching server (in the form of objects) for a particular URL is the same (is "current" or "fresh") as the media data stored by the media data server 102 for the particular URL or whether the cached data is different (is "stale") from the media data stored by media data server 102 for the particular URL.

A cache entry hash table 112 is used to store information mapping the content-sensitive identifiers to objects (or to object handles which refer to the objects) which are used to store the media data cached by caching server system 104. In embodiments where an object is a file, cache entry hash table 112 stores information mapping filenames to file handles which may be used to retrieve the files stored in cache 110. Cache entry hash table 112 may be stored in a memory subsystem of caching server system 104.

There are various ways in which caching server 104 may receive media data to be cached. According to a simplified caching service model, cache 110 of caching server system 104 is populated as a result of data requests received from client systems 106. According to this particular embodiment, if caching server system 104 determines that media data requested by a data request received from a client system is not stored in cache 110 (i.e., a "cache miss"), caching server system 104 obtains the requested media data from media data server 102 and delivers the media data to the requesting client system, while caching the media data in the form of objects. The cached media data is then available for subsequent data requests. As described above, if the requested media data is stored in one or more objects in the cache (i.e., a "cache hit"), caching server system 104 can resolve the data request from its cache rather than having to fetch the requested media data from media data server 102. The requested media data is retrieved from cache 110 and communicated to the client system that was the source of the data request.

According to an alternative embodiment, cache 110 of caching server system 104 may be populated when media data server 102 pushes (sometimes referred to a "pre-filling the cache") media data (e.g., the media data file) stored by media data server 102 to caching server system 104. Media data server 102 may push the media data file to caching server system 104 so that the data is closer to client systems 106 to reduce the time required for providing the media data to client systems 106. There are several other advantages to pushing media data to caching server system 104 or pre-filling the cache of caching server system 104.

Media data may also be pushed from a computer system or device that is not acting as a media data server. These systems are sometimes referred to as "content mover systems." A content mover system may receive media data from media data server 102 or from another content mover system and push the media data to caching server 104. In a specific embodiment, a content mover system and a media data server may share the same back-end storage system storing the media data file. Media data may also be pushed from one caching server system to another.

An example of a caching server system is the NetCache™ 5.2 system provided by Network Appliance, Inc. of Sunnyvale, Calif. The NetCache™ 5.2 system is a combination of hardware and software available from the assignee of the present patent application. The NetCache family of products currently includes the NetCache C1100, NetCache C3100, and NetCache C6100 including proprietary hardware and software.

Figure 2:
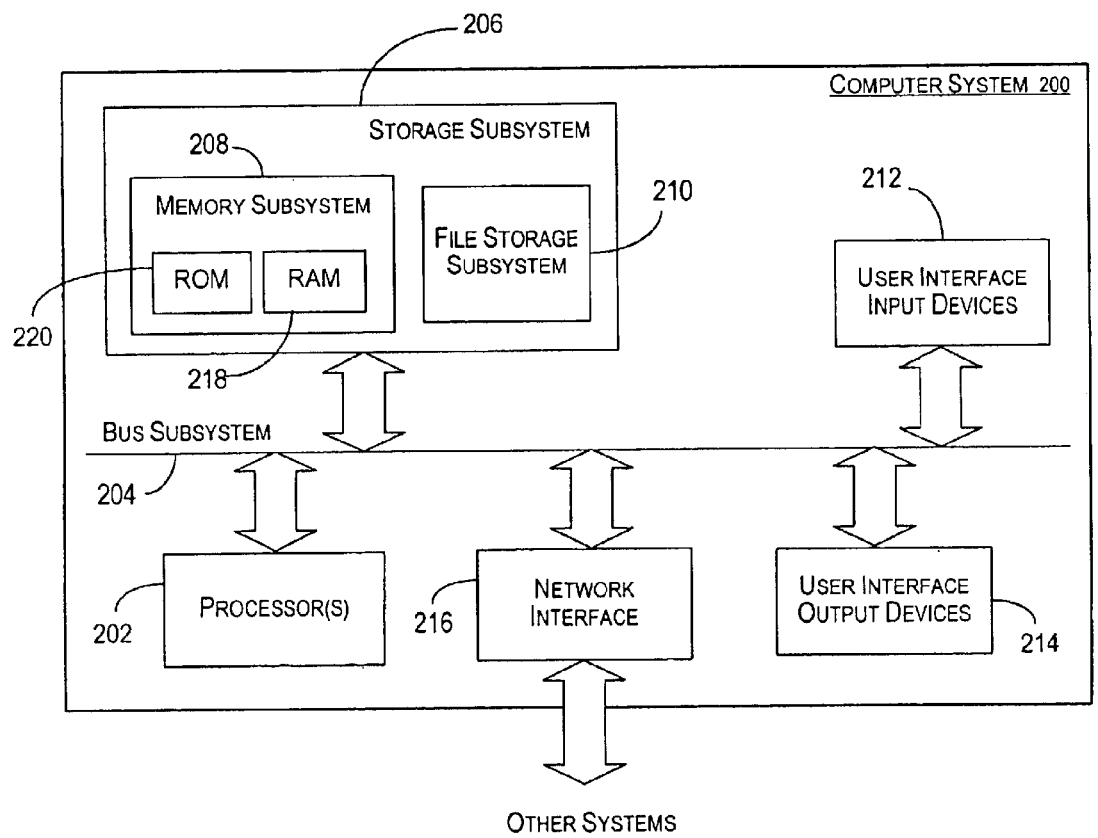
FIG. 2 is a simplified block diagram of a computer system according to an embodiment of the present invention.

FIG. 2 is a simplified block diagram of a computer system 200 according to an embodiment of the present invention. Computer system 200 may be used as any of the computer systems depicted in FIG. 1 and combinations thereof. As shown in FIG. 2, computer system 200 includes at least one processor 202, which communicates with a number of peripheral devices via a bus subsystem 204. These peripheral devices may include a storage subsystem 206, comprising a memory subsystem 208 and a file storage subsystem 210, user interface input devices 212, user interface output devices 214, and a network interface subsystem 216. The input and output devices allow user interaction with computer system 200. A user may be a human user, a device, a process, another computer, and the like.

Network interface subsystem 216 provides an interface to other computer systems. Embodiments of network interface subsystem 216 include an Ethernet card, a modem (telephone, satellite, cable, ISDN, etc.), (asynchronous) digital subscriber line (DSL) units, and the like.

User interface input devices 212 may include a keyboard, pointing devices such as a mouse, trackball, touchpad, or graphics tablet, a scanner, a barcode scanner, a touchscreen incorporated into the display, audio input devices such as voice recognition systems, microphones, and other types of input devices. In general, use of the term "input device" is intended to include all possible types of devices and ways to input information using computer system 200.

User interface output devices 214 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200.

Storage subsystem 206 may be configured to store the basic programming and data constructs that provide the functionality of the computer system and of the present invention. For example, according to an embodiment of the present invention, software modules implementing the functionality of the present invention may be stored in storage subsystem 206 of caching server system 104. These software modules may be executed by processor(s) 202 of caching server system 104. In a distributed environment, the software modules may be stored on a plurality of computer systems and executed by processors of the plurality of computer systems. Storage subsystem 206 may also provide a repository for storing various databases that may be used to store information according to the teachings of the present invention. For example, cache entry hash table 112 may be stored in storage subsystem 206 of caching server system 104. Storage subsystem 206 may also function as cache 110 of caching server system 104. Storage subsystem 206 may comprise memory subsystem 208 and file storage subsystem 210.

Memory subsystem 208 may include a number of memories including a main random access memory (RAM) 218 for storage of instructions and data during program execution and a read only memory (ROM) 220 in which fixed instructions are stored. File storage subsystem 210 provides persistent (non-volatile) storage for program and data files, and may include a hard disk drive, a floppy disk drive along with associated removable media, a Compact Digital Read Only Memory (CD-ROM) drive, an optical drive, removable media cartridges, and other like storage media. One or more of the drives may be located at remote locations on other connected computers.

Bus subsystem 204 provides a mechanism for letting the various components and subsystems of computer system 200 communicate with each other as intended. The various subsystems and components of computer system 200 need not be at the same physical location but may be distributed at various locations within network 100. Although bus subsystem 204 is shown schematically as a single bus, alternative embodiments of the bus subsystem may utilize multiple busses.

Computer system 200 itself can be of varying types including a personal computer, a portable computer, a workstation, a computer terminal, a network computer, a mainframe, a kiosk, a personal digital assistant (PDA), a communication device such as a cell phone, an entertainment console (PS2, X-box), or any other data processing system. Computer system 200 may function as a client or a server, or combinations thereof. Due to the ever-changing nature of computers and networks, the description of computer system 200 depicted in FIG. 2 is intended only as a specific example for purposes of illustrating the preferred embodiment of the computer system. For example, other types of processors are contemplated, such as the Athlon™ class microprocessors from AMD, the Pentium™-class or Celeron™-class microprocessors from Intel Corporation, PowerPC™ G3 or G4 microprocessors from Motorola, Inc., Crusoe™ processors from Transmeta, Inc. and the like.

Further, other types of operating systems are contemplated in alternative embodiments including WindowsNT™ from Microsoft, Solaris from Sun Microsystems, LINUX, UNIX, MAC OS X from Apple Computer Corporation, BeOS™, and the like. Many other configurations of a computer system are possible having more or fewer components than the computer system depicted in FIG. 2.

FIG. 3 is a simplified high-level flowchart 300 of a method of configuring content-sensitive identifiers and using the content-sensitive identifiers to store cached objects according to an embodiment of the present invention. In one embodiment, the method is performed by software modules executed by caching server system 104, or hardware modules coupled to caching server system 104, or combinations thereof. Flowchart 300 depicted in FIG. 3 is merely illustrative of an embodiment incorporating the present invention and does not limit the scope of the invention as recited in the claims. One of ordinary skill in the art would recognize variations, modifications, and alternatives.

As depicted in FIG. 3, the method is initiated when caching server system 104 receives information to be cached (step 302). As described above, the information to be cached may be received in step 302 in response to a data request received from client system 106 or the information may be pushed to caching server system 104. For example, caching server system 104 may receive a data request from client system 106 requesting media data associated with a particular URL, and if the data request results in a cache miss, caching server system 104 may obtain the requested media data for the particular URL from the media data server storing media data for the particular URL and cache the data.

According to an embodiment of the present invention, the information received in step 302 includes media data description information (or media data meta-data) and media data (or payload) associated with data pointer (e.g., a URL). The media data description information comprises information related to various attributes and properties of the media data (payload) associated with the URL, e.g., the URL associated with the media data, the length of the media data, etc. Further details related to the media data description information are provided below. The media data (or payload) comprises information to be output to the user in response to the data request received from the user.

Caching server system 104 may receive the information to be cached in various formats. According to an embodiment of the present invention, the information to be cached may be received in the form of a file. For example, caching server 102 may receive a media data file storing streaming media information corresponding to a particular URL identified in a data request. The file may contain both the media data description information and the payload data associated with the particular URL.

Alternatively, caching server system 104 may receive streaming media data description information and the payload information associated with a particular URL in the form of logical streams of packets. The media data description information may be contained in one or more header packets received by caching server system 104 followed by a logical stream of packets containing streaming media data (or payload) associated with the URL. Streaming media data for a particular URL may be broken down into different encodings, e.g., ISDN encoding, DSL encoding, 56K encoding, and the like. According to the present invention, each encoding is treated as a separate logical stream. Each logical stream as a whole is a stream of packets coming from the same encoding.

The media data description information for streaming media data associated with a particular URL may include information related to the various logical streams corresponding to different encodings for the particular URL. The media data description information may also include an enumeration of the various encodings, copyright and authoring information for the media data associated with the URL, duration or play-time of the logical streams associated with the URL, version information, title of the media data file associated with the URL, average packet size for the various encodings, and the like. Some of the information included in the media data description information, such as title information, copyright and authoring information, etc., may be set or configured by the creator of the media data. The media data description information thus comprises information related to extrinsic properties of a media file (e.g., author information, copyright information, title information, etc.) as well as information related to intrinsic properties of the media file (e.g., number of media tracks, length of media file, encoding bitrate, MIME type, codec of each media track, etc.).

The media data description information helps to uniquely identify a particular version of media data associated with a URL and stored by media data server 102. Since the contents of the media data associated with a URL may change over time, the version information (included in the media data description information) uniquely identifies the version of the media data presently associated with the URL on media server 102. For example, for a URL "www.hourlynews.com", the media data (e.g., news data) associated with the URL may be changed/updated every hour. As a result, at time "T" hour, the "www.hourlynews.com" URL may be associated with a first version media data on media server 102, while at time "T+1" hours, the same URL may be associated with a second version media data which is different from the first media data. The version information for the URL uniquely identifies the contents of the media data presently associated with the URL. Thus, the version information for URL "www.hourlynews.com" changes as the contents of the media data associated with the URL change. Accordingly, the version information (which is included in the media data description information) at time "T" is different from the version information at time "T+1." It should be apparent that the media data description information may also contain other information and parameters (e.g., author information, information indicating the duration of the logical stream, title information, etc.) which uniquely identify the current contents of media data associated with the URL.

Referring back to FIG. 3, caching server 104 then partitions the information received in step 302 into storage units which can be stored in cache 110 (step 304). According to an embodiment of the present invention, caching server 104 partitions the information received in step 302 into objects which can be stored in cache 110. As stated above, the information, including media data description information and media data (payload), may be received in step 302 in file format or as streaming packets. If the information is received in the form of packets, caching server system 104 generates objects by selecting sets of media data packets and forming objects from the packet sets. If the information in step 302 is communicated to caching server system 104 in the form of a media file rather than as packets, caching server system 104 generates packets from the media file and generates objects based on sets of media data packets. For further details related to creation of objects and the structure of objects according to a specific embodiment of the present invention, please refer to U.S. Provisional Patent Application No. 60/297,943, entitled "STREAMING MEDIA PAYLOAD STORAGE METHOD AND APPARATUS" filed Jun. 12, 2001, U.S. Provisional Patent Application No. 60/297,945, entitled "PRE-COMPUTING STREAMING MEDIA PAYLOAD METHOD AND APPARATUS" filed Jun. 12, 2001, and U.S. Non-Provisional Patent Application No. 09/981,644, entitled "METHODS AND APPARATUS FOR PACING DELIVERY OF STREAMING MEDIA DATA" filed concurrently with this application, the entire contents of which are herein incorporated by reference for all purposes. Other types of object structures and methods for generating objects are also included within the scope of the present invention.

Each object is configured to store a portion of the media data received by caching server system 104. As indicated above, each object represents a storage unit which stores a portion of the media data received by caching server system 104. According to an embodiment of the present invention wherein the media data comprises streaming media data, each object is configured to store a portion of the media data for a predetermined amount of performance or play time, i.e., each object is configured to store streaming media data that will be played on client system 106 for a specific amount of time. For example, each object may store streaming data for "n" seconds of performance time. The value of "n" is generally fixed for a particular logical stream and is user-configurable. The value of "n" may however be different for different logical streams. Thus, a streaming media logical stream is broken down or partitioned into a series of objects each containing "n" seconds of streaming media data.

According to an embodiment of the present invention, the value of "n" is set to 10 seconds of performance time. In other embodiments, each object may store data having different duration, such as less than or equal to approximately 5 seconds, 20 seconds, 30 seconds, 1 minute, or the like. In one embodiment each object may store a specified amount of data. For example, each object may store a pre-determined number of bytes of data, for example, less than or equal to approximately 64 Kbytes, 128 Kbytes, 512 Kbytes, 1 Mbyte, or the like. In another embodiment, each object may simply store "chapters" or logical segments of a movie or a video, and the like. In yet another embodiment, each object may store a fixed number of data chunks.

As part of step 304, each object is assigned an object number based on the position of the portion of the media data stored by the object within the logical data stream. In embodiments of the present invention where each object is configured to store media data of a pre-determined performance time, an object is assigned an object number based upon the temporal position of the portion of the media data stored by the object within the logical data stream. For example, in an embodiment of the present invention where the value of "n" is 10 seconds, the object storing media data for the first 10 seconds of the logical stream may be assigned an object number of "1", the object storing media data for seconds 11 through 20 may be assigned an object number of "2", and so on. Accordingly, in this embodiment (assuming that the first object is assigned a number "1"), an object assigned an object number "M" stores media data for (((M-1) * n)+1) seconds through (M * n) seconds.

Figures 4, 5:
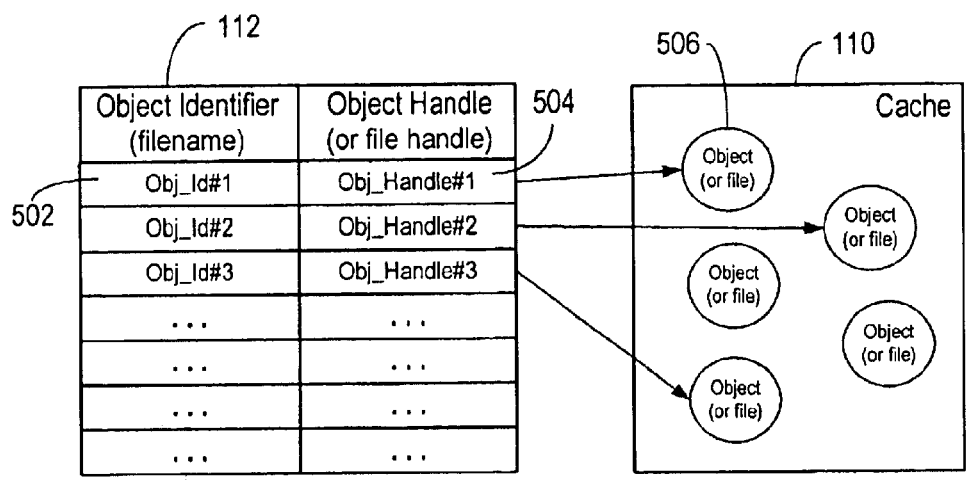
FIG. 4 depicts an object name string generated for an object according to an embodiment of the present invention.
FIG. 5 depicts a simplified diagram of a cache entry hash table according to an embodiment of the present invention.

For each object generated in step 304, caching server system 104 then configures and associates a string (hereinafter referred to as the "object name string") with the object based upon information which uniquely identifies the version of media data stored by the object (step 306). FIG. 4 depicts an object name string 400 generated for an object according to an embodiment of the present invention. As depicted in FIG. 4, object name string 400 is generated by concatenating one or more strings comprising information that uniquely identifies the version of the media data stored by the object. Object name string 400 depicted in FIG. 4 is merely illustrative of an embodiment incorporating the present invention and does not limit the scope of the invention as recited in the claims. One of ordinary skill in the art would recognize variations, modifications, and alternatives.

Object name string 400 depicted in FIG. 4 includes a reserved string 402, a string 404 indicating the name of the URL (or data reference or data pointer) corresponding to the media data stored by the object, a string 406 representation of the encoding used for the logical stream, a validator string 408 for the object, and a string representing the object number 410 assigned to the object. It should be apparent that in alternative embodiments of the present invention, other strings and/or values not depicted in FIG. 4 may also be used to generate the object name string. Additionally, in alternative embodiments of the present invention, the object name string may be generated using fewer strings and/or values than those depicted in FIG. 4.

Reserved string 402 may be any string such as the name of the company providing the caching server system, the name of the product performing the caching, the version of the product performing the caching, and the like. The use of reserved string 402 is optional and not essential for the performance of the present invention.

String 404 identifies the URL (or data pointer or data reference) whose media data is stored by the object. As stated above, information identifying the URL may be included in the media data description information received by caching server system 104 in step 302. The URL information or a portion thereof may be used to generate string 404. For example, if the object stored media data corresponding to the URL "www.hourlynews.com," string 404 may be correspond to "www.hourlynews.com" or variations thereof.

As described earlier, streaming media data for a particular data pointer or reference (e.g., a URL) may be broken down into different encodings, e.g., ISDN encoding, DSL encoding, 56K encoding, and the like. Each encoding is treated as a separate logical stream and media data for a particular URL included in separate logical streams are stored separately. String 406 is a textual representation identifying the encoding used for the media data stored by the object.

Validator string 408 is generated by caching server system 104 based upon media data description information for the media data received by caching server system 104 in step 302. According to an embodiment of the present invention, validator string 408 represents the textual representation of the hash of the media data description information or portions thereof for the URL whose media data is being cached. The portion of the media data description information that is hashed to generate validator string 408 typically includes information related to distinctive features of the media data, e.g., version information, author information for the media data, title information for the media data, duration of the media data, average packet size for the media data, etc. Accordingly, both extrinsic and intrinsic properties of the media data associated with a URL indicated by the media data description information may be used to generate validator string 408. Since the media data description information includes information which uniquely identifies the version or contents of the media data associated with the URL and stored by media data server 102, the value of the validator string 408 also uniquely identifies the current version of the media data for the URL. Accordingly, validator string 408 reflects changes in the media data description information which may occur when the version of the media data associated with the URL and stored by media data server 102 changes, i.e., the validator string is content-sensitive and uniquely identifies the version of the media data associated with the URL.

For example, for the "www.hourlynews.com" example described above, when first version media data is associated with a URL and stored by media data server 102, a first validator string value would be computed based on media data description information for the first version media data. When the contents of the media data stored by media data server 102 and associated with the URL are changed from first version to a second version media data, the media data description information for the URL also changes to reflect the change in the version of the media data associated with the URL. As a result of the change in the media data description information, a second validator string value which is different from the first validator string value is computed by caching server system 104.

According to an embodiment of the present invention, a Message Digest 5 (MD5) hashing technique, which is a cryptographic message digest algorithm, is used to generate the validator string. The MDS algorithm takes as input a message of arbitrary length and produces as output a 128-bit "fingerprint" or "message digest" of the input. According to the teachings of the present invention, the MD5 algorithm is applied to the media data description information (or portion thereof) to generate the validator string. It is believed to be computationally infeasible to produce two messages having the same message digest, or to produce any message having a given pre-specified target message digest. Thus, use of the MD5 hashing technique ensures that the validator string uniquely identifies the contents of the media data associated with an URL.

String 410 is a textual representation of the object number assigned to a particular object being processed. As described above, each object is assigned an object number based on the position of the media data stored by the object within the logical data stream. In embodiments of the present invention where each object is configured to store a portion of media data of a pre-determined performance time, an object is assigned an object number based upon the temporal position of the portion of the media data stored by the object within the logical data stream.

Since object name string 400 is a concatenation of various strings which are content-sensitive (e.g., validator string 408, string 410 representing the object number, etc.), the object name string as a whole is also content-sensitive, i.e., the value of object name string 400 changes as the contents or the version of the media data associated with the URL and cached by caching server 104 changes.

Referring back to FIG. 3, for each object generated in step 304, the object name string generated in step 306 for the object is hashed to generate an object identifier (or object key) for the object (step 308). Various hashing techniques may be used to generate object identifiers for the objects. According to an embodiment of the present invention, each object name string generated in step 308 is hashed using the MD5 hashing algorithm. Since object name strings are content-sensitive, the object identifiers generated based upon the object name strings are also content-sensitive and uniquely identify the version of the media data stored by the objects.

The objects generated in step 304 are then stored in cache 110 of caching server system 104 (step 310). An object may be accessed from cache 110 via an object handle provided by the object. An object handle may be a reference or pointer to an object stored in cache 110. According to an embodiment of the present invention, an object corresponds to a file stored in cache 110. In this embodiment, each object handle corresponds to a file handle that may be used to access the file. Each object stored in cache 110 can be accessed independent of other objects cached by caching server 104. Likewise, individual files are each independently accessible from cache 110.

As part of step 310, information mapping object identifiers generated in step 308 to object handles for the objects is stored in cache entry hash table 112. In the embodiment where each object corresponds to a file, an object identifier corresponds to a filename and an object handle corresponds to a file handle that may be used to retrieve the corresponding file identified by the filename from cache 110. Caching server system 104 may then use the information stored in cache entry hash table 112 to determine if particular media data has been cached and to retrieve the cached data (further details provided below with respect to FIG. 6).

FIG. 5 depicts a simplified diagram of a cache entry hash table 112 according to an embodiment of the present invention. Cache entry hash table 112 depicted in FIG. 5 is merely illustrative of an embodiment incorporating the present invention and does not limit the scope of the invention as recited in the claims. One of ordinary skill in the art would recognize variations, modifications, and alternatives.

As depicted in FIG. 5, cache entry hash table 112 comprises a plurality of entries wherein each entry includes a context-sensitive object identifier 502 (which is generated in step 308 of FIG. 3) for a particular object and an object handle 504 for the particular object. Object handle 504 may be a reference or pointer to an object 506 corresponding to the object identifier and stored in cache 110. Object handle 504 may be used to retrieve the corresponding object from cache 110. As described above, according to an embodiment of the present invention, objects are stored as separate files in cache 10. In this embodiment, each object identifier 502 corresponds to a filename and each object handle 504 corresponds to a file handle that can be used to retrieve the corresponding file identified by the filename and stored in cache 110. As indicated above, each object can be accessed independent of other objects cached by caching server 104. Likewise, if the objects correspond to files, the individual files are each independently accessible from cache 10.

Figure 6:
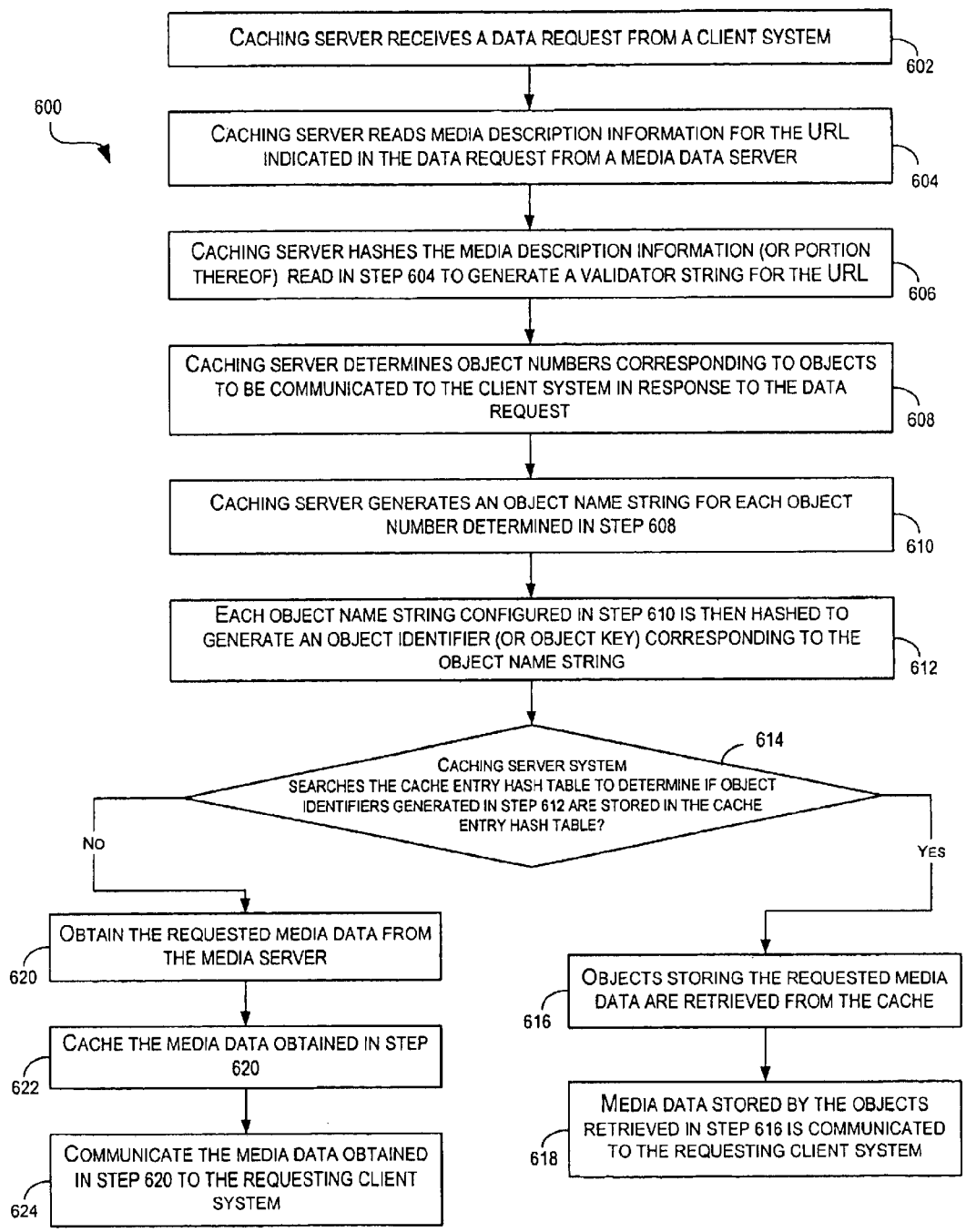
FIG. 6 is a simplified high-level flowchart of a method performed by a caching server system for serving media data, including streaming media data, to a client system in response to a media data request received from the client system according to an embodiment of the present invention.

FIG. 6 is a simplified high-level flowchart 600 of a method performed by caching server system 104 for serving media data, including streaming media data, to a client system 106 in response to a media data request received from the client system according to an embodiment of the present invention. Flowchart 600 depicted in FIG. 6 is merely illustrative of an embodiment incorporating the present invention and does not limit the scope of the invention as recited in the claims. One of ordinary skill in the art would recognize variations, modifications, and alternatives.

As depicted in FIG. 6, the method is initiated when caching server system 104 receives a media data request from a client system 106 (step 602). The data request may take the form of a user clicking upon a URL on a web page to request streaming media data associated with the URL. Additionally, the request may specify a presentation time "$P_t$" that represents the time where the playback should begin. For most requests, $P_t$ is zero (default value) indicating that the playback is to start from the beginning of the media data associated with the selected URL. However, certain media players allow the user to start playback of the streaming media data from a user-specified time that may be different from the start time (i.e., start playback at some intermediate time between the start time and end time associated with the media clip). In such a scenario, time $P_t$ is non-zero.

The data request may also comprise information identifying the encoding to the used for streaming the requested media data to the requesting client system. Alternatively, caching server system 104 may deduce the encoding to be used based upon the attributes and characteristics of the communication link from caching server system 104 and client system 106, or based upon the media player (or any other program executing on client system 106) being used by the user to playback the streaming media data.

Upon receiving the data request from client system 106, caching server system 104 reads the media data description information for the selected URL from the media data server storing media data for the URL requested by the data request (step 604). Caching server system 104 then hashes the media data description information (or a portion thereof) read in step 604 to generate a validator string for the URL (step 606). Techniques used for generating a validator string have been previously described with respect to FIG. 4. Since the media data description information includes information (e.g., version information, author information, title information, duration of the logical stream, etc.) which uniquely identifies the version of the media data associated with the URL, the value of the validator string changes as the contents or version of the media data associated with the URL changes, i.e., the validator string is content-sensitive and uniquely identifies the version of media data associated with the URL and stored by media data server 102. The validator string is used to detect whether the media data associated with the URL and stored by the media data server has changed.

Caching server system 104 then determines object numbers corresponding to objects to be communicated to client system 106 in response to the data request (step 608). The object number corresponding to the first object may be computed based upon the value of $P_t$ and the criteria (e.g., the value of "n" if objects are configured based upon playback time, etc.) used by caching server 104 for configuring the objects. If $P_t$ is zero, and assuming that the first object is allocated an object number of "1", this indicates that the first object to be retrieved is object number "1." If $P_t$ is 35 seconds, and if "n" is set to 10 seconds, then the first object to be retrieved is object number "3." In general, according to an embodiment of the present invention, the object number corresponding to the first object to be retrieved may be calculated using the following formula (assuming that the first object in the logical stream is assigned a number of "1"):

$$\text{Object number of first object to be retrieved} = \left\lfloor \frac{P_t}{n} \right\rfloor$$

Where
$P_t$=time when the playback should begin (in seconds)
n=time of media data stored by an object (in seconds)

Caching server 104 then generates an object name string for each object number identified in step 608 (step 610). As described above with respect to FIG. 4, according to an embodiment of the present invention, each object name string is generated by concatenating strings pertaining to information that uniquely identifies the version of the requested media data stored by the objects. According to an embodiment of the present invention (as depicted in FIG. 4), an object name string for an object is generated by concatenating a reserved string, a string indicating the name of the URL selected by the user, a string representation of the encoding used for the logical stream, a validator string corresponding to the URL determined in step 606, and a string representing the object number determined in step 608. It should be apparent that in alternative embodiments of the present invention, other strings and/or values may also be used to generate the object name string. Additionally, in alternative embodiments of the present invention, the object name string may be generated using fewer strings and/or values than those described above.

Since the object name string is a concatenation of strings which are content-sensitive (e.g., validator string, the string representing the object number, etc.), the object name string is itself content-sensitive, i.e., the value of the object name string changes as the content or version of the media data associated with the URL changes.

Each object name string configured in step 610 is then hashed to generate an object identifier (or object key) corresponding to the object name string (step 612). Since object name strings are content-sensitive, the object identifiers generated in step 612 are also content-sensitive. According to an embodiment of the present invention, the object name string generated in step 610 is hashed using the MD5 hashing algorithm to generate an object identifier.

Caching server system 104 then searches the cache entry hash table to determine if the object identifiers generated in step 612 are stored in the cache entry hash table (i.e., if object identifiers matching the object identifiers generated in step 612 are stored in the cache entry hash table) (step 614). If caching server 104 determines that matching object identifiers are stored in the cache entry hash table, it indicates that the current version of media data requested by the user is stored in cache 110 of caching server system 104. The object handle (or file handle if the object is stored as a file) mapping to each matching object identifier (or filename if the object is a file) in the cache entry hash table is then used to retrieve the corresponding object from cache 110 (step 616). Media data stored by the retrieved objects is then served or communicated to the requesting client system 106 (step 618).

If the object identifiers generated in step 612 are not located or found in the cache entry hash table in step 614, it indicates that the current version of the requested media data has not been cached by caching server system 104. Caching server system 104 may then obtain the requested media data from media data server (step 620) and then cache the obtained media data according to the method depicted in flowchart 300 in FIG. 3 (step 622). The media data obtained in step 620 may then be communicated or served to the requesting client system (step 624).

As described above, according to the teachings of the present invention, content sensitive object name strings and object identifiers are used to unambiguously determine whether the current version of media data has been cached by the caching server system 104. In other words, caching server system 104 uses the content sensitive information to determine if the cached media data is "current" or "stale."

According to the present invention, if a matching object identifier is not located in the cache entry hash table, it implies that the current version of the media data has not been cached. This may be due to the fact that media data corresponding to the selected URL may never have been cached by caching server 104 or alternatively, the media data cached by caching server 104 for the selected URL may be different from the media data currently associated with the URL on media data server 102. Caching server system 104 may then obtain the current media data from the media server and forward the data to the requesting client system while caching the media data at the same time.

According to the teachings of the present invention, the current version of media data for the user-selected URL is cached without invalidating or overwriting the previously cached version of the media data associated with the URL. This is because, according to the teachings of the present invention, different versions of media data for the same URL are stored in separate and independently accessible objects, each associated with a unique object identifier. For example, a first cached object may store the first 10 seconds of a first version of media data for a URL, and a second cached object, which is completely different from and independently retrievable from the first object, may store the first 10 seconds of a second version of media data for the same URL. Each cached object can be accessed independent of other cached objects using the unique object identifier associated with the object.

In the scenario described above, the cache entry hash table may store a first object identifier which maps to a first object handle of the first object storing the first version of the media data for the URL, and a second object identifier which maps to a second object handle of the second object storing the second version of the media data for the URL. Accordingly, the first cached object can be accessed using the first object handle and the second cached object can be accessed using the second object handle. In this manner, objects storing several different versions of the media data associated with a particular URL can co-exist together in the cache. The different cached versions of the media data for the URL are all available to satisfy data requests from client systems 106.

Coexistence of different versions of media data for a particular URL in the cache offers several advantages over conventional caching systems. For example, lets assume that first version media data is associated with a URL and cached by caching server system 104. Now assume that the media data associated with the URL on the media data server is changed to second version media data. In response to a subsequent data request, caching server system 104 is able to determine based upon the content-sensitive object identifiers that the second version of the requested media data is not cached by the caching server. Caching server 104 would then obtain the second version of the media data for the URL and serve it to the requesting client system, while caching the second version of the media data without overwriting or in any way affecting the cached first version of the media data. Now let assume that the media data associated with the URL was reverted back to the first version media data on media data server 102. In this scenario, for a subsequent data request, caching server system 104 is able to determine that the first version of the media data, which is now the current version, is already cached in cache 110. Caching server 104 can then serve the first version of the media data to the requesting client computer without having to re-read the first version of the media data from the media data server.

The ability of the present invention to store different versions of media data for a particular URL (or any data pointer or reference in general) is substantially different from conventional caching systems wherein the first version media data for a particular URL is typically overwritten or invalidated when the second version media data for the same URL is cached. As a result, in the scenario described above, a conventional caching system would have to re-read the first version media data for the URL from the media data server to satisfy the data request.

Additionally, if there are several media data servers with the same "name" (URL, hostname, or the like), each storing similar but slightly different content, conventional caching systems might continuously think that the media is going from fresh to stale and cause -neither- content to be in cache. However, the present invention avoids such a "false miss" problem and allows the content from all servers to be stored in the cache as distinct objects (and served from the cache) at the same time.

According to the present invention, since caching server 104 is capable of storing different versions of media data for a particular URL, caching server system 104 may serve a cached first version of media data for the particular URL to a client system while caching a second version of the media data for the same URL. For example, assume that the first version of media data for a particular URL has already been by cached by caching server system 104. When caching server system 104 receives a data request from a first client system for the particular URL, caching server system 104 can retrieve the cached first version of the media data from cache 110 and serve it to the requesting first client system. Now lets assume that the media data associated with the particular URL on media data server 102 is changed from the first version to a second version media data while the cached first version is being served to the first client system. Further, lets assume that caching server system 104 receives a second data request from a second client system for the particular URL while the first version media data is being played back to the first client system and after the media data has been changed to the second version on media data server 102. In this scenario, in response to the data request from the second client system, caching server system 104 would determine the staleness of the cached data, obtain the second version media data from the media data server, and cache the second media data. All this can be performed while the first version media data is being served to the client, since caching of the second version media data does not affect, overwrite or invalidate the cached first version media data. The code modules that manipulate the cached media objects do not even have to be aware of the different versions of the cached data. This is not possible with conventional caching systems.

Further, after the second version media data has been cached, the second version media data can be served to the second client system while the first version media data is being served to the first client system. In general, multiple versions of the cached media data can be served to client systems concurrently This is also not possible with conventional caching systems.

Since each cached media data object is accessed using a unique content-sensitive object identifier, the objects, including objects storing different versions of media data for a particular URL, can all be stored in the same directory. This enables caching server system 104 to maintain a single persistent directory structure and access the different versions of the media data via a single indexing operation. This is substantially different from techniques wherein different versions of cached data are stored in different directories, which requires multiple indexing operations to retrieve the cached data. Accessing a media data object from a single directory is simpler and requires fewer memory references than accessing a cached object from a multiple directory structure. Since only one directory may be used according to the teachings of the present invention, no updates to the cache directory structure are needed according to the techniques of the present invention.

The teachings of the present invention may also be applied to applications other than streaming media data applications. For example, the concepts of the present invention could be applied to caching a file transfer protocol such as HTTP. Today's HTTP applications use a lot more information besides just URL information to determine what content exactly is to be delivered for the URL. The content served from HTTP URLs may vary based upon requested compression settings, internet connection settings, different language-encodings, browser versions, and other like criteria (which may be specified by the user). Further, the server serving the content can decide what content to return to a user in response to a content request based upon user-supplied information, as well as other information such as the location of the user, and other meta-data. If only the HTTP URL is used to identify content (as is done conventionally), then only one version of the page corresponding to the URL may be stored in the cache. Each request for the same page using a different browser, in a different language, etc. will require that the cached object be overwritten. Accordingly, the HTTP URL by itself is insufficient for efficient cache performance. The techniques provided by the present invention may be used to improve caching efficiency. Using the techniques described by the present invention, a cache can use the various types of meta-data associated with the URL (e.g., compression settings, browser type, etc.) when caching the content and identifying the cached content. According to the teachings of the present invention, meta data which more uniquely identifies the URL content (besides just the URL) may be used to generate object name strings and object identifiers (or object name strings) which are then used for caching the content. For example, content for "URL/English/MSIE" may be stored simultaneously as "URL/German/Netscape/5" and "URL/German/Netscape/6". By using such techniques, the caching server will be able to serve a large number of clients (with different browsers, internet settings, etc.) using objects stored in the cache while minimizing redundant requests for content to the media data server. The meta-data used for generating the object string names or identifiers for HTTP may also include validating factors such as file-system timestamps, headers returned by the HTTP content servers, etc. The time-based headers that exist in HTTP may be used to generate the object keys or identifiers. A caching system may also incorporate the various content-modifying headers (e.g., language encoding, compression settings, client User-Agent, etc.) into the cache object key.

It should be apparent that the above description describes only a specific embodiment of the present invention and does not limit the scope of the present invention as recited in the claims. Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware or only in software or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method of storing media data in a cache, comprising:
    receiving information associated with a data pointer, the information comprising media data associated with the data pointer and stored by a media data server and first information comprising information identifying a version of the media data associated with the data pointer;
    storing the media data in the cache as a plurality of objects, each object in the plurality of objects storing a portion of the media data; and
    generating an object identifier for each object in the plurality of objects based upon a portion of the first information and the portion of the media data stored by each object, wherein the object identifier for an object identifies the portion of the media data stored by the object and the version of the media data.

2. The method of claim 1 wherein the data pointer is a Uniform Resource Locator (URL).

3. The method of claim 1 wherein the media data comprises streaming media data.

4. The method of claim 1 wherein:
    the first information comprises information related to properties of the media data; and
    storing the media data in the cache as the plurality of objects comprises storing the plurality of objects in the cache such that each object in the plurality of objects is individually accessible from the cache using the object identifier generated for the object.

5. The method of claim 4 further comprising:
    storing mapping information that maps each object in the plurality of objects to an object identifier generated for the object.

6. The method of claim 5 wherein the mapping information stores information mapping the object identifier generated for-an object stored in the cache to an object handle of the object.

7. The method of claim 5 wherein:
    each object in the plurality of objects is a file in a plurality of files;
    generating an object identifier for each object comprises generating a filename for each file in the plurality of files, wherein the filename for a file identifies the portion of the media data stored by the file and the version of the media data;
    storing the media data in the cache as a plurality of objects comprises storing the plurality of files in the cache such that each file in the plurality of files is individually accessible from the cache using a filename generated for the file; and
    storing the mapping information comprises storing information that maps each file in the plurality of files to a filename generated for the file.

8. The method of claim 5 wherein storing the media data in the cache as the plurality of objects comprises:

partitioning the media data into a plurality of portions such that each portion comprises media data of a pre-determined time duration;

storing each portion in the plurality of portions in an object from the plurality of objects; and generating an object number for each object in the plurality of objects based upon the temporal position of the portion of the media data stored by the object in the media data.

9. The method of claim 8 wherein:

the first information comprises version information identifying the version of the media data; and generating an object identifier for each object in the plurality of objects comprises generating an object identifier for each object in the plurality of objects using the version information and the object number generated for the object.

10. The method of claim 9 wherein the first information comprises encoding information for the media data and wherein generating an object identifier for each object in the plurality of objects comprises using the encoding information to generate the object identifier.

11. The method of claim 9 wherein generating an object identifier for each object in the plurality of objects using the version information and the object number generated for the object comprises:

generating a first value based upon the version information;

generating an object string using the first value and the object number generated for the object; and generating the object identifier for the object using the object string.

12. The method of claim 11 wherein:

generating the first value comprises applying a first hashing technique to the version information to generate the first value;

generating the object string using the first value and the object number generated for the object comprises concatenating the first value and the object number to generate the object string; and generating the object identifier for the object using the object string comprises applying a second hashing technique to the object string to generate the object identifier for the object.

13. The method of claim 8 wherein:

the first information comprises version information identifying the version of the media data, second information identifying authorship of the media data, third information identifying a title of the media data, and fourth information identifying a time duration of the media data; and generating an object identifier for each object in the plurality of objects comprises generating an object identifier for each object in the plurality of objects using the version information, the second information, the third information, the fourth information, and the object number generated for the object.

14. The method of claim 5 further comprising:

receiving a data request from a first system requesting media data associated with the data pointer;

in response to receiving the data request, reading the first information associated with the data pointer from the media data server storing the requested media data for the data pointer;

generating object identifiers for the data request based upon the requested media data and a portion of the first information read from the media data server, the object identifiers identifying a version of the requested media data;

searching the mapping information to determine if the object identifiers generated for the data request are included in the mapping information;

retrieving, from the cache, a set of objects corresponding to the object identifiers for the data request that are included in the mapping information; and communicating media data stored by the set of objects retrieved from the cache to the first system.

15. A method of communicating media data from a cache in response to a data request, the method comprising:

storing media data in the cache as a plurality of objects, each object in the plurality of objects storing a portion of the Media data;

storing a first set of object identifiers corresponding to the plurality of objects, wherein an object identifier for an object identifies the portion of the media data stored by the object and a version of the media data;

receiving a data request from a first system requesting media data associated with a data pointer;

reading media data description information associated with the data pointer from a media data server storing the requested media data for the data pointer, the media data description information comprising information related to properties of the media data requested by the data request;

generating a second set of object identifiers for the data request based upon the requested media data and a portion of the media data description information, the object identifiers in the second set identifying the requested media data and a version of the requested media data associated with the data pointer;

determining a third set of object identifiers comprising one or more object identifiers from the second set that are included in the first set of object identifiers;

retrieving, from the cache, a set of objects corresponding to the object identifiers included in the third set of object identifiers; and communicating media data stored by the set of objects retrieved from the cache to the first system.

16. The method of claim 15 wherein generating the second set of object identifiers for the data request comprises:

determining a plurality of object numbers for the requested media data; and generating the second set of object identifiers for the data request using the portion of the media data description information and the plurality of object numbers.

17. The method of claim 16 wherein:

the media data description information comprises first information identifying a version of the media data stored by the media data server and requested by the data request; and generating the second set of object identifiers for the data request comprises generating an object identifier for each object number in the plurality of object numbers using the first information and the object number.

18. The method of claim 17 wherein the media data description information comprises encoding information for the requested media data and generating the second set of object identifiers for the data request comprises using the encoding information to generate the object identifiers.

19. The method of claim 17 wherein generating an object identifier for each object number in the plurality of object numbers using the first information and the object number comprises: [0axb]p1generating a first value based upon a portion of the media data description information including the first information;

generating an object string using the first value and the object number; and generating the object identifier for the object using the object string.

20. The method of claim 16 wherein:

the media data description information comprises first information identifying a version of the media data stored by the media data server and requested by the data request, second information identifying authorship of the media data requested by the data request, third information identifying a title of the media data requested by the data request, and fourth information identifying a time duration of the media data requested by the data request; and generating an object identifier for each object number in the plurality of object numbers comprises generating the object identifier using the first information, the second information, the third information, the fourth information, and the object number.

21. A system for caching media data stored by a media data server system for a data pointer, the system comprising:

a processor; and a memory coupled to the processor, the memory configured to store a plurality of code modules for execution by the processor: the plurality of code modules comprising:

a code module for receiving information associated with a data pointer, the information comprising media data associated with the data pointer and stored by a media data server and first information comprising information identifying a version of the media data associated with the data pointer;

a code module for storing the media data in the memory as a plurality of objects, each object in the plurality of objects storing a portion of the media data; and a code module for generating an object identifier for each object in the plurality of objects based upon a portion of the first information and the portion of the media data stored by each object, wherein the object identifier for an object identifies the portion of the media data stored by the object and the version of the media data.

22. The system of claim 21 wherein the data pointer is a Uniform Resource Locator (URL) and the media data comprises streaming media data.

23. The system of claim 21 wherein:

the first information comprises information related to properties of the media data; and the code module for storing the media data in the memory as the plurality of objects comprises a code module for storing the plurality of objects in the memory such that each object in the plurality of objects is individually accessible from the memory using the object identifier generated for the object.

24. The system of claim 23 wherein the plurality of code modules stored in the memory further comprises:

a code module for storing mapping information that maps each object in the plurality of objects to an object identifier generated for the object.

25. The system of claim 24 wherein the mapping information stores information mapping the object identifier generated for an object stored in the memory to an object handle of the object.

26. The system of claim 24 wherein:

each object in the plurality of objects is a file in a plurality of files;

the code module for generating an object identifier for each object comprises a code module for generating a filename for each file in the plurality of files, wherein the filename for a file identifies the portion of the media data stored by the file and the version of the media data;

the code module for storing the media data in the memory as a plurality of objects comprises a code module for storing the plurality of files in the memory such that each file in the plurality of files is individually accessible from the memory using a filename generated for the file; and the code module for storing the mapping information comprises a code module for storing information that maps each file in: the plurality of files to a filename generated for the file.

27. The system of claim 24 wherein the code module for storing the media data in the memory as the plurality of objects comprises:

a code module for partitioning the media data into a plurality of portions such that each portion comprises media data of a pre-determined time duration;

a code module for storing each portion in the plurality of portions in an object from the plurality of objects; and a code module for generating an object number for each object in the plurality of objects based upon the temporal position of the portion of the media data stored by the object in the media data.

28. The system of claim 27 wherein:

the first information comprises version information identifying the version of the media data; and the code module for generating an object identifier for each object in the plurality of objects comprises a code module for generating an object identifier for each object in the plurality of objects using the version information and the object number generated for the object.

29. The system of claim 28 wherein the first information comprises encoding information for the media data and wherein the code module for generating an object identifier for each object in the plurality of objects comprises a code module for using the encoding information to generate the object identifier.

30. The system of claim 28 wherein the code module for generating an object identifier for each object in the plurality of objects using the version information and the object number generated for the object comprises:

a code module for generating a first value based upon the version information;

a code module for generating an object string using the first value and the object number generated for the object; and a code module for generating the object identifier for the object using the object string.

31. The system of claim 30 wherein:

the code module for generating the first value comprises a code module for applying a first hashing technique to the version information to generate the first value;

the code module for generating the object string using the first value and the object number generated for the object comprises a code module for concatenating the first value and the object number to generate the object string; and the code module for generating the object identifier for the object using the object string comprises a code module for applying a second hashing technique to the object string to generate the object identifier for the object.

32. The system of claim 27 wherein:

the first information comprises first information identifying the version of the media data, second information identifying authorship of the media data, third information identifying a title of the media data, and fourth information identifying a time duration of the media data; and the code module for generating an object identifier for each object in the plurality of objects comprises a code module for generating an object identifier for each object in the plurality of objects using the version information, the second information, the third information, the fourth information, and the object number generated for the object.

33. The system of claim 24 wherein the plurality of code modules stored in the memory further comprises:

a code module for receiving a data request from a first system requesting media data associated with the data pointer;

a code module for reading the first information associated with the data pointer from the media data server storing the requested media data for the data pointer;

a code module for generating object identifiers for the data request based upon the requested media data and a portion of the first information read from the media data server, the object identifiers identifying a version of the requested media data;

a code module for searching the mapping information to determine if the object identifiers generated for the data request are included in the mapping information;

a code module for retrieving, from the cache, a set of objects corresponding to the object identifiers for the data request that are: included in the mapping information; and a code module for communicating media data stored by the set of objects retrieved from the cache to the first system.

34. A system for communicating media data comprising:

a processor;

a cache; and a memory coupled to the processor, the memory configured to store a plurality of code modules for execution by the processor, the plurality of code modules comprising:

a code module for storing media data in the cache as a plurality of objects, each object in the plurality of objects storing a portion of the media data;

a code module for storing a first set of object identifiers corresponding to the plurality of objects, wherein an object identifier for an object identifies the portion of the media data stored by the object and a version of the media data;

a code module for receiving a data request from a first system requesting media data associated with a data pointer;

a code module for reading media data description information associated with the data pointer from a media data server storing the requested media data for the data pointer, the media data description information comprising information related to properties of the media data requested by the data request;

a code module for generating a second set of object identifiers for the data request based upon the requested media data and a portion of the media data description information, the object identifiers in the second set identifying the requested media data and a version of the requested media data associated with the data pointer;

a code module for determining a third set of object identifiers comprising one or more object identifiers from the second set that are included in the first set of object identifiers;

a code module for retrieving, from the cache, a set of objects corresponding to the object identifiers included in the third set of object identifiers; and a code module for communicating media data stored by the set of objects retrieved from the cache to the first system.

35. The system of claim 34 wherein the code module for generating the second set of object identifiers for the data request comprises:

a code module for determining a plurality of object numbers for the requested media data; and a code module for generating the second set of object identifiers for the data request using the portion of the media data description information and the plurality of object numbers.

36. The system of claim 35 wherein:

the media data description information comprises first information identifying a version of the media data stored by the media data server and requested by the data request; and the code module for generating the second set of object identifiers for the data request comprises a code module for generating an object identifier for each object number in the plurality of object numbers using the first information and the object number.

37. The system of claim 36 wherein the media data description information comprises encoding information for the requested media data and wherein the code module for generating the second set of object identifiers for the data request comprises a code module for using the encoding information to generate the object identifiers.

38. The system of claim 36 wherein the code module for generating an object identifier for each object number in the plurality of object numbers using the first information and the object number comprises:

a code module for generating a first value based upon a portion of the media data description information including the first information;

a code module for generating an object string using the first value and the object number; and a code module for generating the object identifier for the object using the object string.

39. The system of claim 35 wherein:

the media data description information comprises first information identifying a version of the media data stored by the media data server and requested by the data request, second information identifying authorship of the media data requested by the data request, third information identifying a title of the media data requested by the data request, and fourth information identifying a time duration of the media data requested by the data request; and the code module for generating an object identifier for each object number in the plurality of object numbers comprises a code module for generating the object identifier using the first information, the second information, the third information, the fourth information, and the object number.

40. A computer program product stored on a computer-readable storage medium for storing media data in a cache, the computer program product comprising:

code for receiving information associated with a data pointer, the information comprising media data associated with the data pointer and stored by a media data server and first information comprising information identifying a version of the media data associated with the data pointer;

code for storing the media data in the cache as a plurality of objects, each object in the plurality of objects storing a portion of the media data; and code for generating an object identifier for,each object in the plurality of objects based upon a portion of the first information :associated with the data pointer and the portion of the media data stored by each object, wherein the object identifier for an object identifies the portion of the media data stored by the object and the version of the media data.

41. The computer program product of claim 40 wherein the data pointer is a Uniform Resource Locator (URL) and the media data comprises streaming media data.

42. The computer program product of claim 40 wherein:

wherein the first information comprises information related to properties of the media data;

wherein the code for storing the media data in the cache as the plurality of objects comprises code for storing the plurality of objects in the cache such that each object in the plurality of objects is individually accessible from the cache using the object identifier generated for the object; and the computer program product further comprises code for storing mapping information that maps each object in the plurality of objects to an object identifier generated for the object.

43. The computer program product of claim 42 wherein:

each object in the plurality of objects is a file in a plurality of files;

the code for generating an object identifier for each object comprises code for generating a filename for each file in the plurality of files, wherein the filename for a file identifies the portion of the media data stored by the file and the version of the media data;

the code for storing the media data in the cache as a plurality of objects comprises code for storing the plurality of files in the cache such that each file in the plurality of files is individually accessible from the cache using a filename generated for the file; and the code for storing the mapping information comprises code for storing information that maps each filename generated for a file to the file.

44. The computer program product of claim 42 wherein the code for storing the media data in the cache as the plurality of objects comprises:

code for partitioning the media data into a plurality of portions such that each portion comprises media data of a predetermined time duration;

code for storing each portion in the plurality of portions in an object from the plurality of objects; and code for generating an object number for each object in the plurality of objects based upon the temporal position of the portion of the media data stored by the object in the media data.

45. The computer program product of claim 44 wherein:

the first information comprises version information identifying the version of the media data; and the code for generating an object identifier for each object in the plurality of objects comprises code for generating an object identifier for each object in the plurality of objects using the version information and the object number generated for the object.

46. The computer program product of claim 45 wherein the first information comprises encoding information for the media data and wherein the code for generating an object identifier for each object in the plurality of objects comprises code for using the encoding information to generate the object identifier.

47. The computer program product of claim 42 further comprising:

code for receiving a data request from a first system requesting media data associated with the data pointer;

code for reading the first information associated with the data pointer from the media data server storing the requested media data for the data pointer;

code for generating object identifiers for the data request based upon the requested media data and a portion of the first information read from the media data server, the object identifiers identifying a version of the requested media data;

code for searching the mapping information to determine if the object identifiers generated for the data request are included in the mapping information;

code for retrieving, from the cache, a set of objects corresponding to the object identifiers for the data request that are included in the mapping information; and code for communicating media data stored by the set of objects retrieved from the cache to the first system.

48. A computer program product stored on a computer-readable storage medium for communicating media data from a cache in response to a data request, the computer program product comprising:

code for storing media data in the cache as a plurality of objects, each object in the plurality of objects storing a portion of the media data;

code for storing a first set of object identifiers corresponding to the plurality of objects, wherein an object identifier for an object identifies the portion of the media data stored by the object and a version of the media data;

code for receiving a data request from a first system requesting media data associated with a data pointer;

code for reading media data description information associated with the data pointer from a media data server storing the requested media data for the data pointer, the media data description information comprising information related to properties of the media data requested by the data request;

code for generating a second set of object identifiers for the data request based upon the requested media data and a portion of the media data description information, the object identifiers in the second set identifying the requested media data and a version of the requested media data associated with the data pointer;

code for determining a third set of object identifiers comprising one or more object identifiers from the second set that are included in the first set of object identifiers;

code for retrieving, from the cache, a set of objects corresponding to the object identifiers included in the third set of object identifiers; and code for communicating media data stored by the set of objects retrieved from the cache to the first system.

49. The computer program product of claim 48 wherein the code for generating the second set of object identifiers for the data request comprises:

code for determining a plurality of object numbers for the requested media data; and code for generating the second set of object identifiers for the data request using the portion of the media data description information and the plurality of object numbers.

50. The computer program product of claim 49 wherein:

the media data description information comprises first information identifying a version of the media data stored by the media data server and requested by the data request; and the code for generating the second set of object identifiers for the data request comprises code for generating an object identifier for each object number in the plurality of object numbers using the first information and the object number.

51. The computer program product of claim 50 wherein the media data description information comprises encoding information for the requested media data and the code for generating the object identifiers for the data request comprises code for using the encoding information to generate the object identifiers.

52. A system for storing media data in a cache, comprising:

means for receiving information associated with a data pointer, the information comprising media data associated with the data pointer and stored by a media data server and first information comprising information identifying a version of the media data associated with the data pointer;

means for storing the media data in the cache as a plurality of objects, each object in the plurality of objects storing a portion of the media data; and means for generating an object identifier for each object in the plurality of objects based upon a portion of the first information associated with the data pointer and the portion of the media data stored by each object, wherein the object identifier for an object identifies the portion of the media data stored by the object and the version of the media data.

53. A system for communicating media data from a cache in response to a data request, the system comprising:

means for storing media data in the cache as a plurality of objects, each object in the plurality of objects storing a portion of the media data;

means for storing a first set of object identifiers corresponding to the plurality of objects, wherein an object identifier for an object identifies the portion of the media data stored by the object and a version of the media data;

means for receiving a data request from a first system requesting media data associated with a data pointer;

means for reading media data description information associated with the data pointer from a media data server storing the requested media data for the data pointer, the media data description information comprising information related to properties of the media data requested by the data request;

means for generating a second set of object identifiers for the data request based upon the requested media data and a portion of the media data description information, the object identifiers in the second set identifying the requested media data and a version of the requested media data associated with the data pointer;

means for determining a third'set of object identifiers comprising one or more object identifiers from the second set that are included in the first set of object identifiers;

means for retrieving, from the cache, a set of objects corresponding to the object identifiers included in the third set of object identifiers; and means for communicating media data stored by the set of objects retrieved from the cache to the first system.

54. A computer implemented method of storing information, the method comprising:

storing a first set of objects, the first set of objects storing a version of media data associated with a data pointer at a first time, each object storing a portion of the version of the media data;

storing a first set of object identifiers corresponding to the first set of objects, wherein an object identifier in the first set corresponding to an object in the first set of objects identifies the portion of the media data stored by the object and version of the stored media data;

storing a second set of objects, the second set of objects storing a second version of media data associated with the data pointer at a second time different from the first time, each object in the second set storing a portion of the second version of the media data; and storing a second set of object identifiers corresponding to the second set of objects, wherein an object identifier in the second set corresponding to an object in the second set of objects identifies the portion of the media data stored by the object and version of the stored media data.

55. The method of claim 54 further comprising:

communicating the version of the media data stored by the first set of objects to a first system; and communicating the second version of the media data stored by the second set of objects to a second system while the version of the media data is being communicated to the first system.

* * * * *